UNITED STATES PATENT OFFICE.

HORACE FREEMAN, OF NIAGARA FALLS, ONTARIO, CANADA, ASSIGNOR TO AMERICAN CYANAMID COMPANY, OF NEW YORK, N. Y., A CORPORATION OF MAINE.

PROCESS OF PREVENTING THE DECOMPOSITION OF MOLTEN CYANIDS.

1,282,405.  Specification of Letters Patent.  Patented Oct. 22, 1918.

No Drawing.  Application filed April 20, 1918.  Serial No. 229,831.

*To all whom it may concern:*

Be it known that I, HORACE FREEMAN, a subject of the King of Great Britain, residing at Niagara Falls, in the Province of Ontario and Dominion of Canada, have invented certain new and useful Improvements in Processes of Preventing the Decomposition of Molten Cyanids; and I do hereby declare the following to be a full, clear, and exact description of the invention, such as will enable others skilled in the art to which it appertains to make and use the same.

This invention relates to a process of making crude cyanid from calcium cyanamid and has for its object to provide a procedure which will be more efficient and less costly than those heretofore proposed.

With these and other objects in view the invention consists in the novel steps and combinations of steps constituting my process, all of which will be more fully hereinafter disclosed and particularly pointed out in the claims.

As it is well known, crude cyanid can be produced by using a mixture of sodium chlorid and calcium cyanamid with or without the addition of material containing carbon. This fusion is preferably carried out in the electric furnace and the product of the furnace is tapped out and cooled and prepared for shipment.

A suitable mixture for charging the electric furnace, consists of equal parts of sodium chlorid and lime nitrogen, or crude calcium cyanamid to which is added, if desirable, about five per cent. of the weight of the mixture in carbonaceous material, such as free carbon or a material containing combined carbon, such as calcium carbid. With the ordinary grade of crude calcium cyanamid containing 22 to 24 per cent. of nitrogen, the furnacing of such a mixture as above described produces a molten product containing approximately 35 per cent. of its weight of sodium cyanid. This material leaves the electric furnace at or above a bright red heat, and does not solidify until it is cooled down to nearly blackness. In the early days of the industry when operating on mixtures of crude calcium cyanamid and common salt, containing several times as much salt as of crude calcium cyanamid, it was customary to tap the furnaces into chills, or molds, or even into metal containers in which it was shipped. The material would slowly solidify in these containers or molds or chilled cars, and when cold was ready for shipment.

It would contain only, around 10 per cent. of its weight of sodium cyanid and little or no attention was paid to the difficulty about to be described and forming the subject of this invention, and which first became of importance when the process was developed in the making of a higher grade product.

With the development of the process, it was found that the quantity of sodium chlorid added to the mixture could be decreased, and by suitably changing the method of operation to meet the new conditions, it was found possible to turn out of the furnace a fused product much more concentrated in sodium cyanid than that just described. However, it was noted that as the composition of the furnace product increased in sodium cyanid, there began to appear a considerable discrepancy between the analysis of the fused product as sampled from the furnace, and that of the product when set cold in the shipping containers.

With mixtures of approximately equal parts of salt and crude calcium cyanamid or lime nitrogen, the product as tapped from the furnace and sampled with a small spoon, or by dipping a cold iron rod into the stream of melted material, would on analysis, show a content of sodium cyanid of say above 30 per cent. and even as high as 40 per cent. When this same material was cast into containers, holding 400 or 500 pounds and allowed to cool off to surrounding temperatures, and the mass then sampled and analyzed, it was found that the sodium cyanid content would only analyze around say 20 per cent. sodium cyanid, and rarely as high as 25 per cent.

It is therefore apparent that the sodium cyanid produced in the furnace reverts to some other form of nitrogen compound during the process of cooling; and many experiments lead to the conclusion that the reaction producing cyanid from cyanamid is a reversible one and that, therefore, the resulting loss of cyanid on cooling, is due to a reversal of the reaction forming said cyanid.

A closer study of the process shows that this decomposition seems to take place at temperatures between 400° and 700° C., and that it does not occur with the small samples dipped out of the stream flowing from the furnace, when taken in a heavy iron spoon or on a heavy iron rod. It was, therefore, concluded that the decomposition was wholly occasioned by the slow cooling of the mass of molten material, and that if this same material was cooled rapidly to below the temperature limit of its decomposition, this said decomposition would not take place. I accordingly carried out experiments on a large scale involving the chilling of the molten material as it ran from the furnace to temperatures below redness as rapidly as possible, and found that the objectionable decomposition was entirely avoided, and that the product produced in these large scale experiments corresponds in every particular with the analysis of the small test sample as taken with the iron spoon in the manner above described.

My invention, therefore, involves the fusing of a mixture of crude calcium cyanamid and common salt with or without the addition of material containing carbon, in an electric furnace, the tapping of the furnace, and rapidly chilling the product to as low a temperature as can be conveniently done, but in every case preferably below redness. I prefer to perform this cooling by tapping into a heavy iron mold of large cross-section, employing a very thin layer of the molten material so that it sets solid almost instantly when in contact with the metal. Or I can alter this procedure by water cooling the mold into which I tap the fused material, but I in this instance also prefer to maintain a layer of material as thin as possible, because it is of a very low heat conductivity, and therefore, thick layers do not chill very rapidly throughout their whole mass.

I have even carried out the operation, practically automatically, by tapping into a pan, or receiver, and causing a water cooled metal drum on rotating to dip into this receiver. This rotating drum picks up a thin skin of the cyanid which immediately chills on its surface while being carried around with it. I finally scrape this cooled flaked material from the drum with a suitable scraper or knife, and I receive the small flakes thus produced by this apparatus, in a suitable hopper whereupon they may be packed into the shipping containers in any well known manner.

The thin scaly flakes of material thus obtained are found to contain practically all the cyanid that is in the fluid mass as run from the furnace; they lend themselves very readily to the further utilization of the cyanid. That is to say, the crude cyanid so formed is largely used in metallurgical work, for the extraction of precious metals from their ores, in which it is necessary to dissolve the cyanid. The thin flakes of crude cyanid thus produced adapt themselves very efficiently to the dissolving operation and greatly simplify the use of the material in the precious metal industry.

It is obvious that those skilled in the art may vary the details of my process, without departing from the spirit of the invention, and I therefore, do not wish to be limited to the above disclosure except as may be required by the claims.

What I claim is:—

1. The process of producing sodium cyanid consisting in fusing a suitable mixture containing sodium chlorid and lime nitrogen to form said cyanid, and rapidly cooling the fused product as it runs from the furnace to a temperature below that at which decomposition of the cyanid takes place, substantially as described.

2. The process of producing an alkali metal cyanid consisting in fusing a suitable mixture containing an alkali metal chlorid and lime nitrogen to form said cyanid in an electric furnace; tapping said furnace; and rapidly reducing the temperature of the fluid mass to a point below redness, substantially as described.

3. The process of producing sodium cyanid consisting in fusing a mixture containing carbon, sodium chlorid and lime nitrogen in a suitable furnace; tapping the molten product from said furnace and rapidly cooling said product to a temperature below redness in the form of a thin plate or scale, substantially as described.

4. The process of producing sodium cyanid which consists in fusing a mixture containing calcium carbid, sodium chlorid and lime nitrogen in a furnace; tapping the molten product from said furnace; and rapidly cooling the product to a temperature below that at which a decomposition will take place, substantially as described.

5. The process of producing sodium cyanid which consists in fusing a mixture containing calcium carbid, sodium chlorid and lime nitrogen in a furnace; tapping the molten product from said furnace; and rapidly cooling the product in the form of a thin sheet to a temperature below that at which a decomposition will take place.

6. The herein described new product obtained from the fusion and chilling of a mixture containing an alkali metal chlorid and lime nitrogen, the same consisting of a crude alkali metal cyanid in the form of thin flakes, substantially as described.

7. The herein described new product in the form of thin flakes and consisting substantially of sodium cyanid, calcium chlorid, sodium chlorid and free lime, substantially as described.

8. The herein described new product containing more than 30 per cent. of sodium cyanid with some calcium chlorid, sodium chlorid and lime in the form of thin flakes or scales, substantially as described.

In testimony whereof I affix my signature, in presence of two witnesses.

HORACE FREEMAN.

Witnesses:
MARY F. DEIGHTON,
THERESA B. GAISER.